United States Patent
Holzapfel et al.

(10) Patent No.: US 6,175,414 B1
(45) Date of Patent: Jan. 16, 2001

(54) OPTICAL POSITION MEASURING DEVICE

(75) Inventors: Wolfgang Holzapfel, Obing; Volker Höfer, Stein/Traun; Walter Huber, Traunstein, all of (DE)

(73) Assignee: Dr. Johannes Heidenhain GmbH, Traunreut (DE)

( * ) Notice: Under 35 U.S.C. 154(b), the term of this patent shall be extended for 0 days.

(21) Appl. No.: 09/443,238

(22) Filed: Nov. 18, 1999

(30) Foreign Application Priority Data

Nov. 19, 1998 (DE) .............................................. 198 53 295
Jul. 31, 1999 (DE) .............................................. 199 36 181

(51) Int. Cl.$^7$ .................................................. G01B 11/14
(52) U.S. Cl. .................. 356/375; 356/373; 250/231.13; 250/237 G
(58) Field of Search .................................... 356/375, 373; 250/237 G, 231.13, 231.18, 231.14; 33/706, 707

(56) References Cited

U.S. PATENT DOCUMENTS

| | | |
|---|---|---|
| 4,691,101 | 9/1987 | Leonard . |
| 4,785,181 * | 11/1988 | Kimizuka et al. ............... 250/237 G |
| 4,948,968 * | 8/1990 | Matsui ............................. 250/237 G |
| 5,585,924 * | 12/1996 | Schneider et al. .................... 356/375 |
| 5,783,817 * | 7/1998 | Gohring ......................... 250/231.14 |
| 6,031,224 * | 2/2000 | Peterlechner .................... 250/231.13 |
| 6,097,490 * | 8/2000 | Holzapfel et al. ................... 356/373 |

FOREIGN PATENT DOCUMENTS

| | | |
|---|---|---|
| 33 34 400 | 6/1985 | (DE) . |
| 39 08 254 A1 | 9/1990 | (DE) . |
| 39 39 147 | 4/1991 | (DE) . |
| 195 12 258 | 10/1995 | (DE) . |
| 195 12 258 A1 | 10/1995 | (DE) . |
| 197 26 935 | 1/1999 | (DE) . |
| 197 26 935 A1 | 1/1999 | (DE) . |
| 0 239 768 A2 | 10/1987 | (EP) . |

OTHER PUBLICATIONS

Klein et al., "Optics", Springer Pub. 1986, (pp. 381–389).

* cited by examiner

Primary Examiner—Hoa Q. Pham
(74) Attorney, Agent, or Firm—Kenyon & Kenyon (57) ABSTRACT

An optical position measuring device is described for determining the relative position of two objects that are movable in a measuring direction with respect to each other. The position measuring device includes a scale having a scale reference mark structure, which is composed of n blocks arranged in the measuring direction with partial areas of varying optical characteristics. A scanning unit is also included, with a scanning reference pulse structure as well as a plurality of detector elements. Output signals are generated by the detector elements, which at a defined relative position of the two objects, have a maximum or a minimum value.

11 Claims, 5 Drawing Sheets

OPTICAL POSITION MEASURING DEVICE

The present invention relates to an optical position measuring device which is designed for determining the relative position of two movable objects and which supplies a reference pulse signal for at least one defined relative position of the two objects.

DESCRIPTION OF RELATED ART

Known optical incremental position measuring devices for determining the relative positions of two objects that are movable with respect to each other include as a rule an incremental graduation track used as part of a scale. This track is scanned using a scanning unit for generating incremental signals. In addition, provision is also made for the possibility of generating so-called reference pulse signals at one or more clearly defined relative positions of the two objects. For this purpose, on the scale, adjacent to the incremental graduation track, a further reference track is arranged which includes one or more scale reference mark structures placed at defined positions. For generating the reference pulse signals, the structures are also scanned using a scanning unit. The scanning unit, for example, can include a scanning reference mark structure as well as one or more optoelectronic detector elements. As a rule, a reference pulse signal is generated and the reference mark structures on the scale-side and scanning-side are so configured, that at any reference position a signal is generated having a maximum or minimum value at those positions. In order to assure reliable detection of the reference pulse signal, the signal that is generated in this manner is placed in a differential connection with a reference signal and, for this purpose, is connected to the reference signal across the two inputs of a signal subtraction element. At the output of the subtraction element, a signal identifying the respective reference position is then available for further processing.

As a reference or trigger signal for the subtraction element used in optical position measuring systems, a so-called constant light signal having a constant amplitude is used, the constant light signal resulting from the optical scanning of a constant light track.

In addition, it is also known from U.S. Pat. No. 4,691,101 to generate a reference signal as a so-called push-pull reference pulse signal, which has a characteristic curve that is phase-shifted by 180° with respect to the phase of the actual clock reference pulse signal. According to FIGS. 12A and 12B in the above-mentioned document, this is achieved by selecting a correspondingly aperiodical arrangement of the individual immediately adjoining detector elements on the scanning side as a function of an aperiodical sequence of transparent and non-transparent partial areas on the scale. Furthermore, individual scanning-side detector elements are directly assigned to transparent or non-transparent partial areas on the scale. For generating the clock reference pulse signal, those detector elements assigned to the transparent partial areas are connected to each other, while for generating the push-pull reference pulse signal, those detector elements that are assigned to the non-transparent partial areas of the reference pulse scale structure are connected to each other. The two signals are then fed to a subtraction element, at whose output the desired reference pulse signal C is available for further processing.

It is a particular disadvantage of generating output-side reference pulse signals in this manner that the proposed position measuring device having a scale- and scanning-side detector arrangement requires a relatively small distance between the scale and a scanning unit. In many applications, this cannot be guaranteed. Furthermore, due to the irregular incidence of scattered light onto the detector elements, it is possible that the generated reference pulse signals are triggered incorrectly or in a fluctuating manner.

A similar variant for generating a reference pulse signal is also known from German Patent 195 12 258. There provision is made for the direct assignment of planar detector elements to certain areas of a scale-side reference mark structure. The disadvantages of this arrangement are identical to those of the document discussed above.

SUMMARY OF THE INVENTION

The present invention is therefore an optical position measuring device which, in contrast to the related art, makes possible the dependable generation of a reference pulse signal. This is to be assured particularly in the case of larger scanning distances as well as in the case of the incidence of scattered light.

To achieve these and other advantages and in accordance with the purpose of the invention, as embodied and broadly described, the invention is an optical position measuring device for determining a relative position of two objects movable with respect to each other in a measuring direction, by generating a reference pulse signal corresponding to at least one defined relative reference position. The position measuring device includes a scale having a scale reference mark structure, the scale being connected to one of the two objects and the scale reference mark structure being composed of n (n=2,3,4 . . . ) blocks disposed in the measuring direction, the scale reference mark structure blocks having a plurality of sequentially arranged partial areas of varying optical characteristics disposed in the measuring direction. The device also includes a scanning unit connected to the other of the objects and including a scanning plate with a plurality of detector elements and a scanning reference mark structure composed of n blocks arranged sequentially in the measuring direction, the scanning reference mark structure blocks having assigned to them corresponding detector elements. At least a first group of one of the scale reference mark structure blocks and scanning reference mark structure blocks is configured, at the reference position in the plane of a respective other one of the scanning reference and scale reference mark structures, to supply an intensity distribution that is identical to the structure of the associated first group of blocks, and at least a second group of another of the scale reference mark structure blocks and the scanning reference mark structure blocks, in a plane of a respective other one of the scanning reference and scale reference mark structures, supplies an intensity distribution that is complementary to the structure of the associated second group of blocks. The detector elements are interconnected such that output signals of the detector elements of each group of blocks are connected to each other to generate a reference pulse output signal resulting from the output signals, said reference pulse output signal having a maximum or a minimum at the defined relative position of the two objects.

According to the present invention, scanning of one or more scale reference mark structures is accomplished using the scanning reference mark structure in connection with detector elements arranged in a defined manner. In this way, a larger potential scanning distance can be realized.

Due to the larger scanning distance, it is now also possible without difficulty to electrically connect the detector elements employed on their light-sensitive side, using bonding wires, without allowing the latter to be damaged by the scale due to the small scanning distance.

Because the surfaces of the two groups of blocks having the scale and scanning reference mark structures can be selected in the invention so as to be identical, insensitivity with respect to scattered light influences is assured. This is because scattered light influences all of the signal components equally, and the signals that are phase shifted by 180° and that are discharged from both groups of blocks are influenced identically by the scattered light.

In contrast to the related art already discussed, it is possible according to the invention to use relatively insensitive detector elements, not requiring great expense to manufacture, to generate the required high-resolution reference pulse signal.

The optical position measuring device according to the present invention can be realized utilizing both incident light as well as transmitted light. Similarly, the corresponding position measuring device can be used for detecting linear relative movements as well as for detecting rotating relative movements.

BRIEF DESCRIPTION OF THE DRAWINGS

Further advantages as well as details concerning the optical position measuring device according to the present invention can be seen from the following description of exemplary embodiments on the basis of the enclosed drawings.

In the Drawings.

DETAILED DESCRIPTION OF THE INVENTION

Figure 1A:
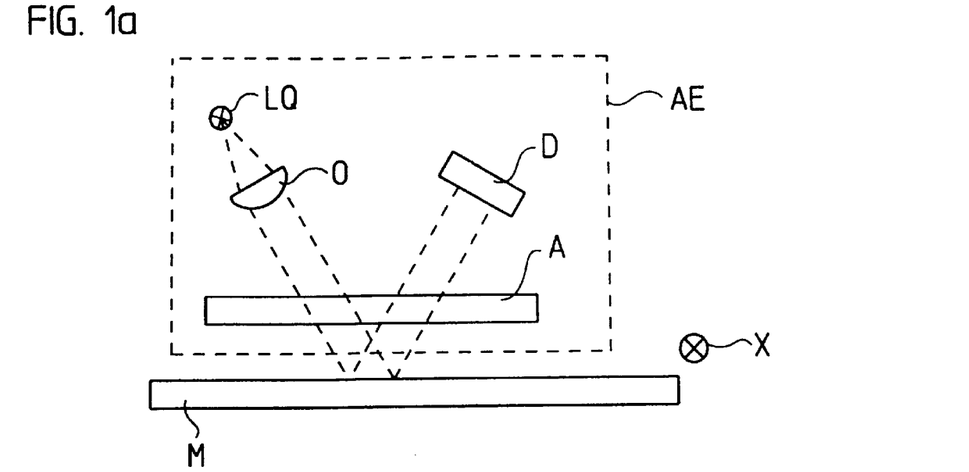
FIGS. 1a–1c are schematic diagrams of an exemplary embodiment of the position measuring device according to the invention, showing respectively an incident-light variant and two transmitted-light variants.
Figure 1B:
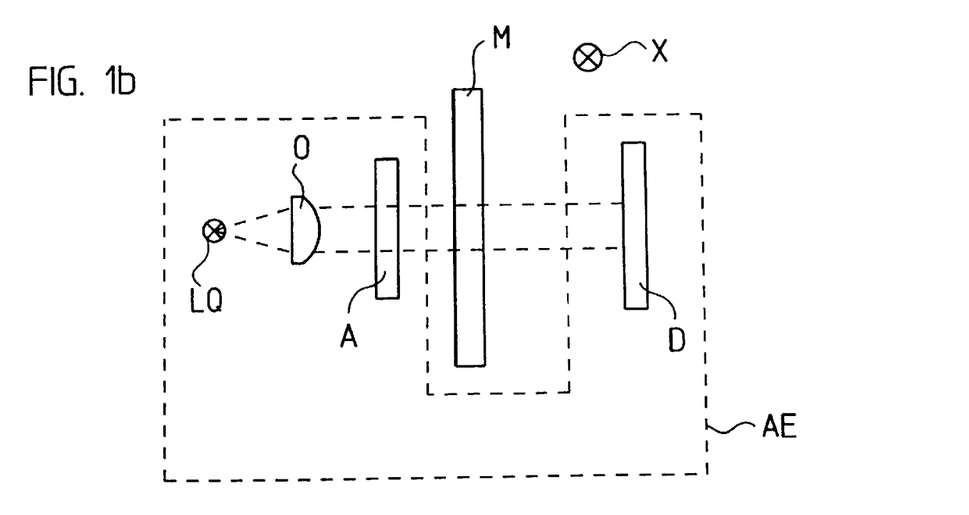
Figure 1C:
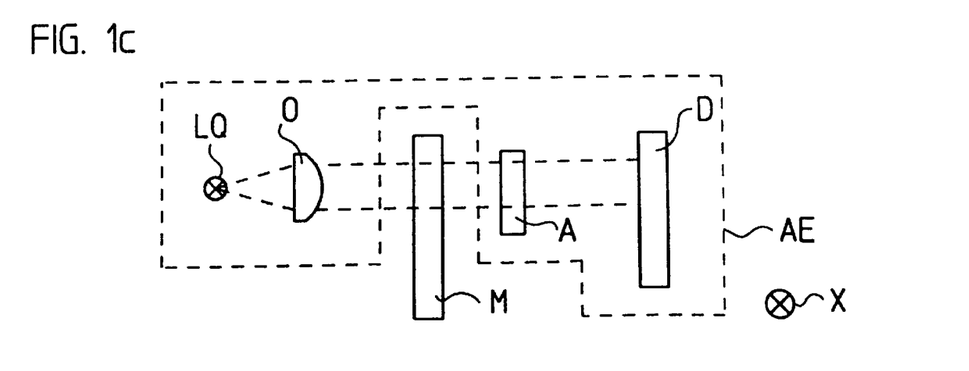

Various possible specific embodiments of the optical position measuring device according to the invention are depicted in FIGS. 1a–1c. The individual variants are distinguished here particularly by their respective configuration as an incident-light measuring system in accordance with FIG. 1a or as a transmitted-light measuring system in accordance with FIGS. 1b and 1c.

The specific embodiments depicted of a position measuring device according to the invention include, in each case, a scanning unit 11 as well as a scale 12 scanned by it. Scanning unit 11 and scale 12 are connected to components which can move relative to each other and whose relative positions are to be precisely determined using the position measuring device. The actual components are not shown in the figures. Measuring direction x is the direction in which scanning unit 11 and scale 12 are movable with respect to each other, and is in all three cases shown in the figures perpendicular to the drawing plane. The components that are movable with respect to each other can be, for example, a tool and a work piece in a numerically controlled machine tool.

Scanning unit 11 of the exemplary embodiments depicted includes, in each case, a light source 14, an optical system 16, a scanning plate 18, as well as a detector unit 21. Provision can furthermore be made to arrange in scanning unit 11 various signal processing elements, which take on the further processing of the scanning signals generated, before they are transmitted to a downstream evaluation unit, which can be a numerical machine tool control unit.

In the exemplary embodiments depicted, optical system 16 functions to collimate the beam of rays emitted by light source 14. Similarly, optical system 16 could also have a focusing or partially focusing effect. In addition, the concepts of the invention can also be realized in position measuring devices that do not have any optical system at all between light source 14 and scanning plate 18 or scale M, i.e., in systems having a so-called divergent illumination.

The various specific embodiments of the position measuring device according to the invention include, on the scale side, an incremental dividing track, not shown in the drawings, that performs optical scanning in a known manner to generate two phase-shifted incremental signals. Provision is further made to generate reference pulse signals at one or more locations along the measuring path in scanning scale M, using scanning unit 11 to scan scale M, to generate an absolute reference for the position measuring.

Figure 2:
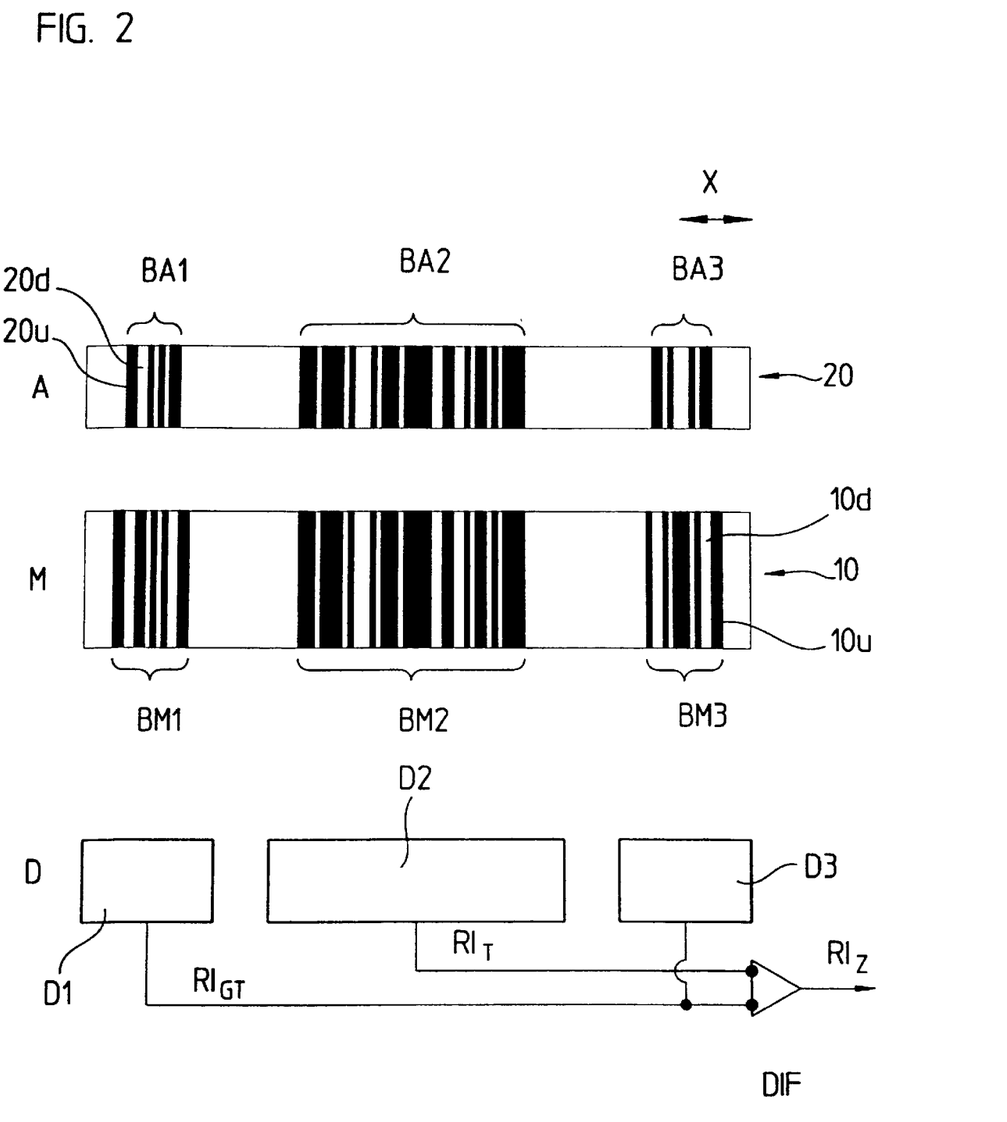
FIG. 2 is a diagram showing the components of a first exemplary embodiment of the position measuring device, as applied to the scale as well as to the scanning unit.
Figure 3:
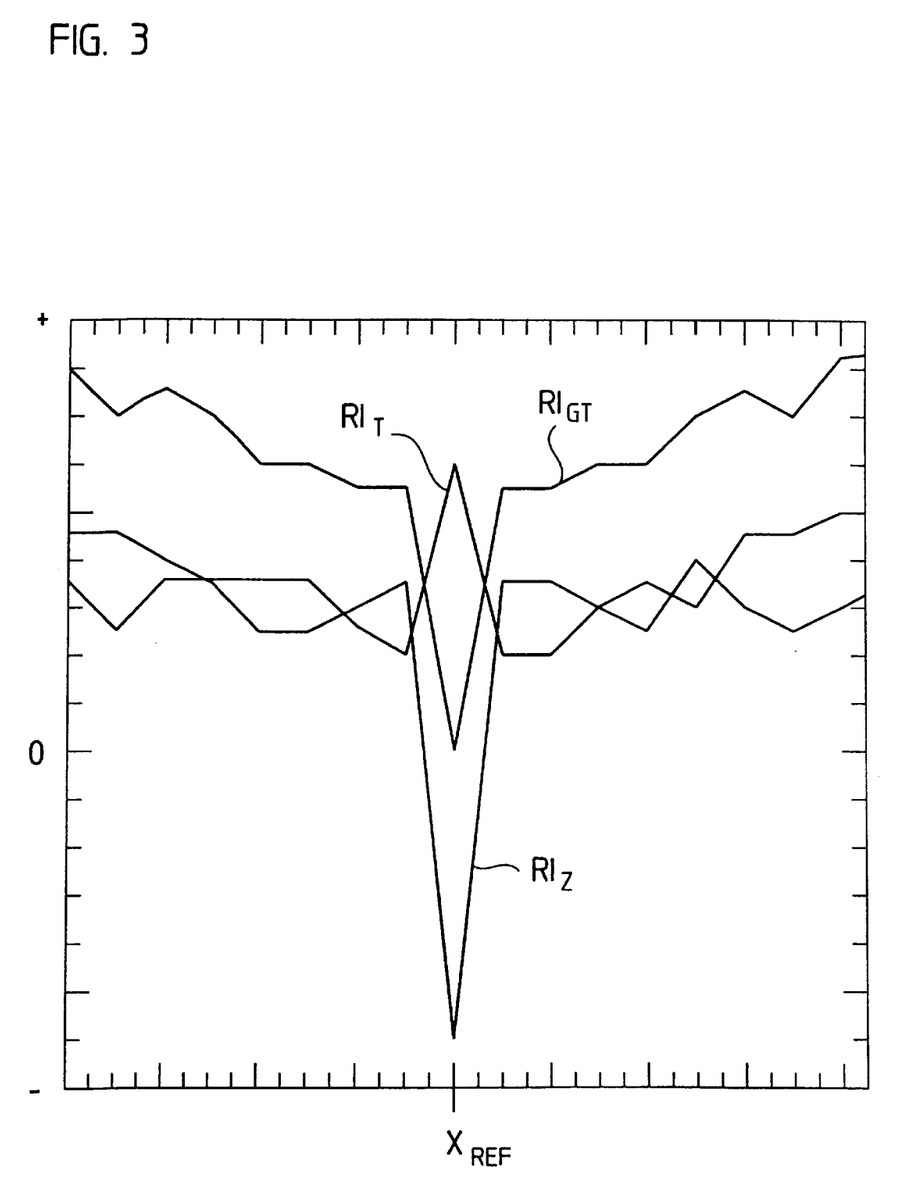
FIG. 3 is a plot representing the signals obtained from the exemplary embodiment according to FIG. 2.
Figure 4:
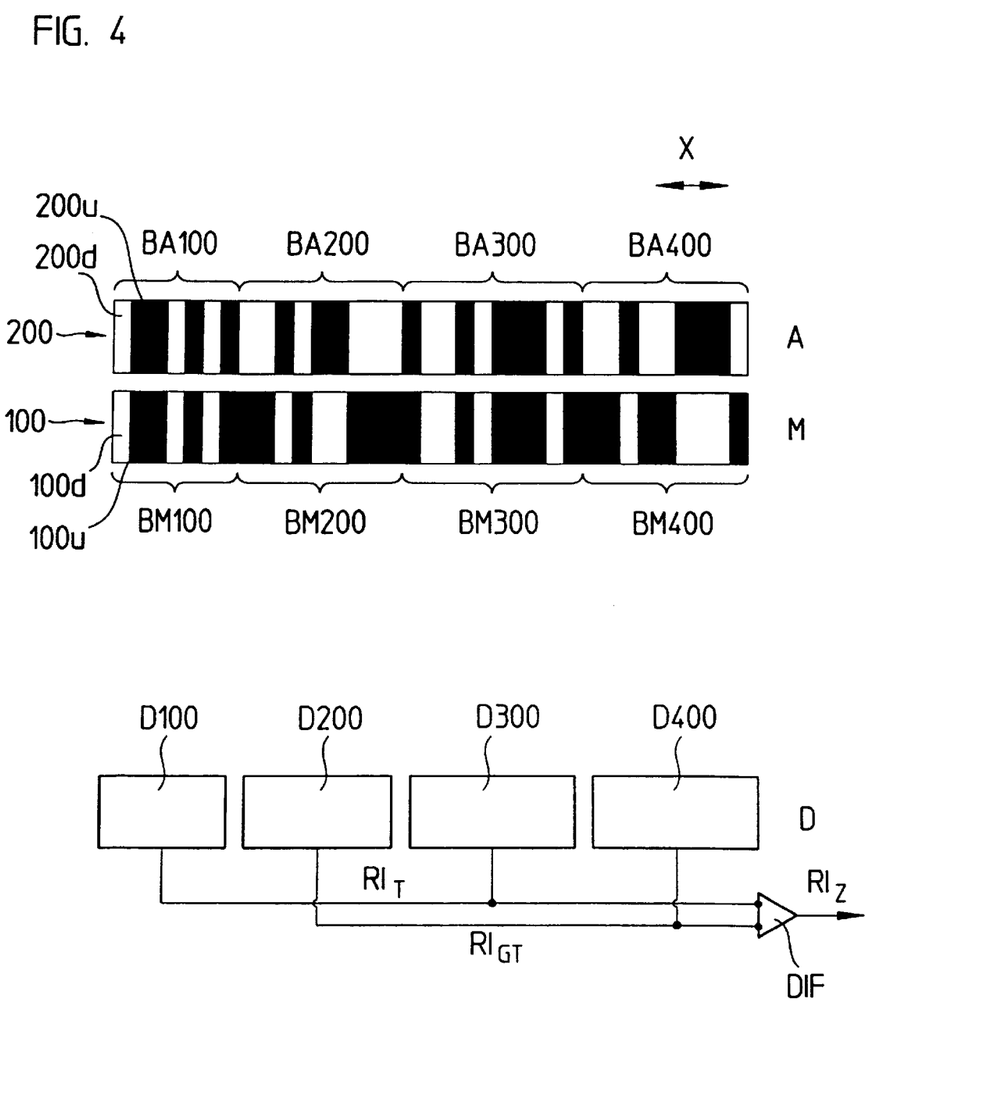
FIG. 4 is a diagram showing the components of a second exemplary embodiment of the position measuring device, as applied to the scale as well as to the scanning unit.

In the description of FIGS. 2–4 below, details of the invention particularly with reference to the generation of reference pulse signals and the measures required for this purpose on the part of scale M, scanning plate 18, and detector unit 21 will be discussed in greater detail.

In FIG. 1a, a specific embodiment of the position measuring device is depicted in the configuration of an incident-light system, in which scale 12 and the structures arranged thereon for generating the various scanning signals are composed of alternating partial areas, each successive partial area being alternatingly reflecting and non-reflecting. Scanning plate 18 in turn includes structures that are composed of alternating transparent and non-transparent portions.

The embodiments depicted in FIGS. 1b and 1c are configured as transmitted-light systems. In these two cases, structures for generating scanning signals are arranged on scale M, the structures being composed of alternating transparent and non-transparent partial areas. The structures arranged on the respective associated scanning plates A are in turn configured analogously to those of the example in FIG. 1a, i.e., they are composed of alternating transparent and non-transparent partial areas.

The two transmitted-light embodiments in FIGS. 1b and 1c differ from each other only in the sequence of the components arranged with respect to light source 14. Thus, provision is made in accordance with the example in FIG. 1b to dispose scanning plate 18 directly after light source 14 and optical system 16, so that the beam of rays from scanning plate 18 subsequently arrives at scale 12 and then at detector unit 21.

In contrast, in the example of FIG. 1c, the various components are arranged such that scanning plate 18 is located directly before the detector unit and the beam of rays first encounters scale 12 and only then arrives at scanning plate 18, before it is detected by detector unit 21.

Although the devices that are depicted in the three FIGS. 1a–1c are linear position measuring devices, it is obviously possible to apply the considerations underlying the invention explained below to optical position measuring devices for rotating parts.

A first specific embodiment of the optical position measuring device according to the invention is discussed in greater detail on the basis of FIG. 2. In particular, the manner of the generation of a reference pulse signal is explained.

The central part of FIG. 2 shows a scale reference mark structure 10, which is composed of a plurality of blocks BM1–BM3, disposed along the measuring direction, having in each case aperiodical sequences of partial areas 10d, 10u, the partial areas having varying optical characteristics. In the case of one transmitted-light configuration according to FIG. 1b, bright partial areas 10d are configured so as to be transparent, whereas dark partial areas 10u are configured so as to be non-transparent. In the exemplary embodiment of the incident-light variant according to FIG. 1a, the partial areas 10u, 10d of scale reference mark structure 10 are respectively configured as non-reflecting and reflecting.

The exemplary embodiments of FIGS. 2 and 3 describe transmitted-light variants of the optical position measuring device according to the invention. The concepts underlying the present invention can also be applied by analogy to incident-light systems.

In the exemplary embodiment of FIG. 2, a total of three blocks BM1–BM3 are used. However, it is also possible to use more than three blocks for each scale reference mark structure 10. However, the position measuring device of the invention requires at least n of such blocks within each scale reference mark structure 10, with $n \geq 2$.

On the scanning-side, i.e., on the side of scanning plate 18, there is a scanning unit 11 for scanning reference mark structure 20, which is also composed of n blocks BA1–BA3 arranged along measuring direction x, with, for example, n=3. As a consequence, there are as many n blocks BA–BA3 arranged as there are blocks on scale M, within scale reference mark structure 10. The blocks of scanning reference mark structure 20 include, in turn, partial areas 20u, 20d adjacently arranged along measuring direction x and having varying optical characteristics. In this context, partial areas 20d depicted in the drawing as bright are configured as transparent, whereas partial areas 20u depicted as dark are configured as non-transparent to the impinging beam of light.

In the representation of FIG. 2, scanning unit 11 and scanning plate 18 are located exactly at reference position $x_{ref}$, which is to be detected.

The configuration and arrangement of various blocks BM1–BM3 and BA1–BA3 within the scale and within the scanning reference mark structures are chosen such that, in at least one of the first group of blocks BM2, BA2, the arrangement of partial areas 10u, 10d, 20u, 20d on the part of scale and scanning reference mark structures 10, 20 is identical. In the exemplary embodiment depicted, this group is composed, in each case, only of one single block BM2 and BA2, respectively on scale 12 and on scanning plate 18.

A second group of blocks BM1, BM3, BA1, BA3 is also configured such that partial areas 10u, 10d, 20u, 20d within these blocks BM1, BM3, BA1, BA3 are arranged so as to be complementary to each other on scale 12 and scanning plate 18. The term complementary is to be understood in the context of the depicted transmitted-light embodiments of FIG. 2, to mean that when a transparent partial area 10d is used on scale M, it is necessary to arrange a non-transparent partial area 10u at the corresponding location on scanning plate 18. The same is done for additional pairs of partial areas.

In the incident-light case having a reflection scale according to FIG. 1a, on the other hand, the first group transparent partial areas on the scanning plate are assigned to reflecting partial areas on the scale, and non-transparent partial areas on the scanning plate are assigned to non-reflecting partial areas on the scale. In the complementary arrangement of the partial areas within the second group, for the incident-light variant, provision is made for assigning transparent partial areas on the scanning plate to the non-reflecting partial areas on the scale, and the non-transparent partial areas on the scanning plate to the reflecting partial areas on the scale.

Each of the various blocks BA1-BA3 within the scanning reference mark structure has assigned to it a planar optoelectronic detector elements D1–D3 in a fixed spatial relation in scanning unit 11. The detector element measures the beams of light emitted from light source 14 which impinge thereon via scanning plate 18 and scale M. Each of the detector elements D1–D3 has a light-sensitive surface and an extension in measuring direction x, the extension corresponding to a multiple of the width of various partial areas 10u, 10d within the reference mark structures on scale 12 and on scanning plate 18.

Provision is also made in this variant that the surfaces of blocks BA1–BA3, BM1–BM3 of the two groups are selected such that both groups essentially have surfaces of the same size. In the depicted exemplary embodiment of FIG. 2, this means that the sum of the two surfaces of blocks BA1 or BM1 and BA3 or BM3, respectively, are selected so as to be approximately the same as the surface of block BA2 or BM2.

The surfaces of detector elements D1–D3, which are assigned to the two groups, are selected to be of essentially identical size. In the exemplary embodiment of FIG. 2, the added light-sensitive surfaces of the two detector elements D1 and D3 are essentially identical to the surfaces of detector element D2. Furthermore, the surfaces of individual detector elements D1–D3 are in each case dimensioned to be somewhat larger than the assigned surfaces of blocks BA1–BA3. In this way, it can be assured that if scale 12 and scanning unit 11 or scanning plate 18 are slightly tilted, the assignment of the various blocks BA1–BA3 to the respective detector elements D1–D3 remains unaffected.

In contrast to the related art as seen in U.S. Pat. No. 4,691,101, the individual detector elements D1–D3 of the various groups have assigned to them blocks on scale 12 or scanning plate 18 which have an internal patterning. For this purpose, provision is made in the case of each block BA1–BA3 or BM1–BM3 for a multiplicity of partial areas 20d, 20u, 10d, 10u having varying optical characteristics. As a result of this measure, the width of the most recently generated reference pulse signal can conveniently be adjusted as desired.

The desired contamination-insensitivity in the generation of a reference pulse signal in accordance with the present invention results from the coarse structure of the block on both the scale and the scanning unit, and from the corresponding assignment and interconnection of the detector elements.

The various detector elements D1–D3 are interconnected in accordance with the invention so that in each case detector elements D1–D3, assigned to one group, are interconnected with each other cumulatively. In the exemplary embodiment in FIG. 2, detector elements D1 and D3 are interconnected in series for this purpose, and the composite signal is connected to the inverting input of a subtraction element DIF, which can be an operational amplifier. Since only one single detector element D2 belongs to the second group, the former is interconnected with no other detector element, but rather is connected to the non-inverting input of subtraction element DIF.

Signals $RI_T$ and $RI_{GT}$, generated in this way for the two groups, now have in reference position $x_{ref}$ a maximum or a minimum. Accordingly, at the output of subtraction element DIF a reference pulse signal $RI_z$ results which has a maximum or a minimum at reference position $x_{ref}$. Therefore, in a transmitted-light variant according to FIG. 1b, a minimum is available at reference position $x_{ref}$ in derived signal $RI_{GT}$ due to the configuration of scale reference mark structure 10 and of scanning reference mark structure 20 in detector elements D1 and D3 of the first group. Signal $RI_T$ generated from detector element D2 of the second group in turn has a maximum at position $x_{ref}$.

It should be noted that the signal curves of $RI_T$ and $RI_{GT}$ can be selected in a reverse manner, with the configuration of the various structures on the part of the scale and the scanning being advantageously modified in the context of the present invention.

The exemplary embodiment in FIG. 2, in which relatively fine reference mark structures 10, 20 on scale 12 and scanning plate 18 are used in connection with relatively coarsely structured detector elements D1–D3, is particularly suitable for optical position measuring devices using a large beam spread in the beam emitted by light source 14. By way of example, use of this system in connection with an optical position measuring device having divergent illumination would be possible, as is described in German patent 197 2 6 935 of the applicant. The coarse, spatially well separated detector elements D1–D3 prevent an undesirable optical cross-talk between adjacent detector elements. It is also advantageous that there is no necessity for any extremely fine patterning on the part of the detector unit D, which would otherwise require great expense in manufacturing.

The curves of the two signals $R_{IT}$ and $RI_{GT}$ in the area of reference position $x_{ref}$, the signals being generated in the exemplary embodiment in FIG. 2, are schematically depicted in FIG. 3.

Both signals $R_{IT}$ and $RI_{GT}$, for the purpose of generating a reference pulse signal $RI_z$ that can be further processed, are ultimately connected to the two inputs of a subtraction element DIF, in which the two input signals $RI_T$ and $RI_{GT}$ are subtracted from each other. At the output of subtraction element DIF, the desired reference pulse signal $RI_z$ results, which can be transmitted for further processing to an evaluation unit. The resulting reference pulse signal $RI_z$ is also indicated in FIG. 3.

A further exemplary embodiment with reference to the generation of the reference pulse signal according to the invention is explained on the basis of FIG. 4. This Figure depicts a part of the various structures on the scanning unit or scanning plate 18, on scale M, as well as a part of the arrangement of the detector elements inside detector unit D. Provision is made on scanning plate 18 or scanning unit 11 for scanning reference mark structure 200, which is composed of two groups of blocks BA100–BA400. In turn, the blocks are composed of partial areas 200u, 200d having varying optical characteristics, which are arranged so as to be adjacent sequentially along measuring direction x.

Scale reference mark structure 100, is arranged in scale 12 and is composed of two groups of blocks BM100–BM400 which include partial areas 100u, 100d having varying optical characteristics. The various possible configurations of respective reference mark structures 100, 200 in transmitted-light and incident-light systems, can be described with reference to the above explanations and to FIG. 2.

In the exemplary embodiment of FIG. 4, each of the two groups of blocks on the scanning side and on the scale side now include a multiplicity of blocks, of which only a portion is depicted in FIG. 4. Thus, on scanning plate 18, blocks BA100 and BA300 belong to the first group. Blocks BA200 and BA400 belong to the second group. On the scale, blocks BM100 and BM300 are assigned to the first group, and blocks BM200 and BM400, are assigned to the second group.

Blocks BA100–BA400 in the scanning unit or on scanning plate 18 have assigned to them planar detector elements D100–D400 of detector unit D, in a fixed spatial arrangement. For example, block BA100 has assigned to it detector element D100, block BA200 detector element D200, block BA300 detector element D300, and block BA400 detector element D400. The same applies to additional not shown blocks.

The first group of blocks BA100, BA300 in scanning plate 18 are in turn configured so as to be identical to associated blocks BM100, BM300. The second group of blocks BA200, BA400 on the scanning plate is configured so as to be once again complementary to the associated group of blocks BM200, BM400 on the scale.

Just as in the previous exemplary embodiment, the surfaces of detector elements D100, D300 are identical to the surfaces of detector elements D200, D400. Due to this circumstance, the same advantage arises as in the previous exemplary embodiment, where the detector elements assigned to the various inputs of the subordinate subtraction elements behave identically with respect to their frequency response.

Similarly to the considerations of the first exemplary embodiment of the invention, provision is also made in the second exemplary embodiment of FIG. 4 that, in each case, the detector elements of a group of blocks are interconnected. For example, detector elements D100 and D300 as well as detector elements D200 and D400 are interconnected. Resulting from the two groups of detector elements in the depicted manner are the so-called clock reference pulse signal $RI_T$ and the push-pull reference pulse signal $RI_{GT}$. Signal $RI_T$ at the reference position in turn has a maximum, while signal $RI_{GT}$ a minimum. Signals $RI_T$, $RI_{GT}$ are fed to the two inputs of a subtraction element DIF, where in turn the subtraction of the two signals $RI_T$, $RI_{GT}$ takes place. At the output of subtraction element DIF, the result is reference pulse signal $RI_z$, which is suitable for further processing. The subtraction also assures, as in the first exemplary embodiment, that any scattered light influences can be eliminated.

In this embodiment, in contrast to the arrangement in FIG. 2, on scanning plate 18 as well as on scale 12 respective reference mark structures 100, 200 are arranged having a clearly smaller spacing between each other, so that ultimately more blocks can be arranged over the entire length of the complete reference mark structure. In contrast to the variant in FIG. 2, this exemplary embodiment is therefore particularly suitable for optical position measuring systems having a small illumination-side spread, since the various groups of blocks and detector elements can be arranged so as to be relatively closely adjoining with respect to each other. In this context, due to the small illumination-side spread, no potential cross-talk between adjacent blocks or detector elements is possible.

The exemplary embodiment discussed with respect to FIGS. 2 and 4 includes, both on the scale as well as on the scanning-side reference mark, structures which are configured as pure amplitude structures. The alternating partial areas of the various structures were designed either to be transparent and non-transparent, or reflecting and non-reflecting. Using amplitude structures of this type, it is possible, given sufficiently large graduation periods of the respective structures, to generate a reference pulse signal in accordance with the invention. Thus, in the case of graduation periods TP=200 μm, it is possible to generate a high-contrast reference pulse signal in the manner of the present invention. However, as soon as finer structures having smaller graduation periods are used, with one graduation period approximately equal to TP=20 μm, then in the case of scanning distances often required in practice of more than 0.5 mm, it is no longer possible to have a sufficiently good image formation of the scanning-side reference mark structures onto the scale-side reference mark structures. Instead, diffraction effects increasingly play a role, so that intensity distributions arise that deviate from the intensity distribution that was presumed, due to the diffraction effects in the plane of the scale reference mark structures.

In the context of the present invention, it is possible even in the case of smaller graduation periods of the reference mark structures used and of the larger scanning distances, to obtain a generation of a reference pulse signal on the basis of the principles elaborated above. This is explained on the basis of an incident-light variant of the optical position measuring device according to the invention, whose fundamental optical design is sketched in FIG. 1a.

Due to the diffraction effects mentioned above, no scanning reference mark structure can be used in the form of a pure amplitude structure, as was explained by way of example on the basis of FIG. 2. In the case of a prescribed scale reference mark structure 100, which can in principle look like an amplitude structure as in the variants in FIG. 2, the scanning reference mark structure is therefore modified in this specific embodiment such that no further use is made of a pure amplitude structure as in FIG. 2. Instead, provision is made to configure the scanning reference mark structure as a phase structure or as a combined amplitude/phase structure, which ultimately, at reference position $x_{ref}$ in the plane of scale reference mark structure 10, supplies the same image or the same intensity distribution as the amplitude structure of scanning reference mark structure 20, described in FIG. 2. Consequently, it must be assured that in the areas of block BM2 at reference position $x_{ref}$, an intensity distribution results that corresponds to the scale reference mark structure in this block BM2. On the other hand, in the areas of blocks BM1 and BM3, the phase structure required on the scanning side must be secured against the possibility that an intensity distribution in the scale plane results at reference position $x_{ref}$ which is complementary in these areas to the scale reference mark structure. On the detector side, various detector elements D1–D3 can then be interconnected as shown.

Configuring the corresponding phase structure or a combined phase/amplitude structure on the scanning plate represents no further difficulty to one skilled in the art. Problem definitions of this type are known, for example, in connection with the holographic generation of defined intensity patterns. In this regard, reference is made for example to Chapter 7.3.3.3 of the textbook "Optics" by M. V. Klein, T. E. Furfak, Springer Publishers 1986 (p. 381–389).

In this manner, it is therefore possible to configure a phase structure or a combined phase/amplitude structure without difficulty, if a desired intensity distribution is given in a certain plane. This is described below in a simple example.

Figure 5:
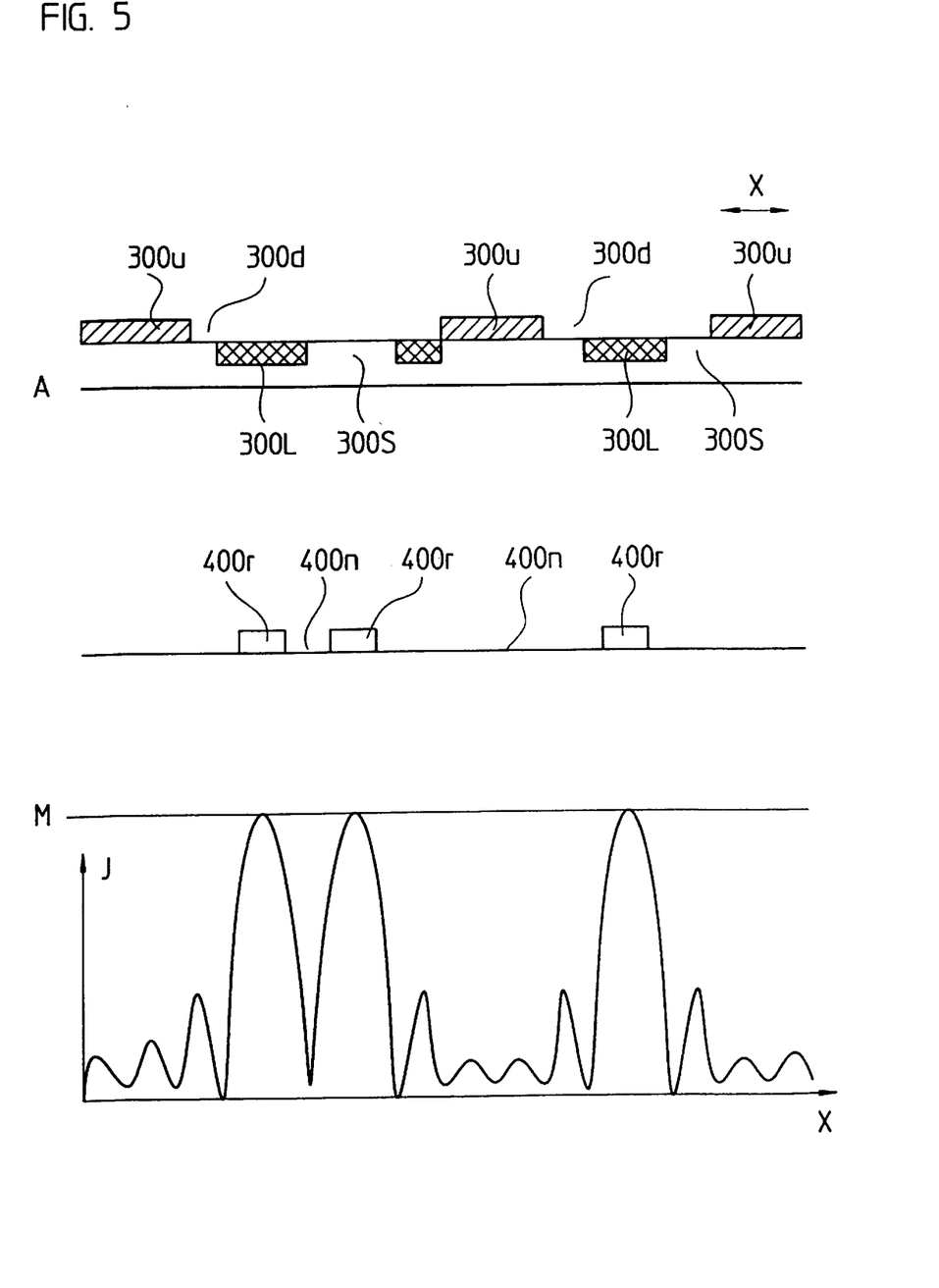
FIG. 5 is a side view of a portion of the scanning plate of a third exemplary embodiment of the invention, also showing a plot of the signal intensity resulting therefrom, and one part of the associated scale reference mark structure.

The upper part of FIG. 5 depicts a cross-section of scanning plate 18 of this exemplary embodiment of the optical position measuring device according to the invention. The depicted cross-section is a part of scanning reference mark structure 300, which is configured as a combined phase/amplitude structure, which in the scale plane supplies a given prescribed intensity distribution. Scanning reference mark structure 300 in this example is composed of a coarse amplitude structure having transparent and non-transparent partial areas 300d, 300u arranged in alternating order along measuring direction x. In the transparent partial areas 300d, however, phase-shifting structures, such as cylindrical lenses, are arranged in a defined manner. The phase-shifting structures are configured in transparent partial areas 300d as bars 300S and gaps 300D arranged in sequence so as to alternate along measuring direction x.

The cross-section depicted in FIG. 5 of scanning reference mark structure 300, configured as a phase/amplitude structure, is assigned at reference position $x_{ref}$ to a selected part of scale reference mark structure 400 on scale M. This area of scale 12 and of the corresponding reference mark structure 400 is indicated below scanning reference mark structure 300. This depicts roughly a cross-section of a block of scale reference mark structure 400, in which an intensity distribution is to be generated which corresponds to scale reference mark structure 400. Scale reference mark structure 400, in this context, in the incident-light case, is composed of reflecting partial areas 400r and non-reflecting partial areas 400n, arranged so as to alternate. Similarly to the considerations elaborated above, there must consequently result in this block in the reflecting partial areas 400r an intensity maximum at reference position $x_{ref}$, whereas in the non-reflecting partial areas 400n, located in between, an intensity minimum is required.

The phase/amplitude structure depicted in the upper part of FIG. 5 supplies precisely this type of intensity distribution, as is indicated in the lower part of FIG. 5. There, against measuring direction x, the resulting intensity distribution of the cross-section of scanning reference mark structure 300 is indicated, which generates the necessary intensity maximums at the reflecting partial areas 400r of scale reference mark structure 400.

By using a suitable configuration of the complete scanning reference mark structure, as a pure phase structure or as a combined phase/amplitude structure, it is therefore possible to generate a high-contrast reference pulse signal according to the invention even in the case of smaller graduation periods and in a necessarily larger scanning distance.

The exemplary embodiments heretofore elaborated of the optical position measuring device can be modified in various ways in the context of the present invention.

It was shown in the exemplary embodiments of FIGS. 2–5 that a given intensity distribution on scale 12 results as a function of the configuration of the structures on scanning plate 18. However, this arrangement is by no means the only possible one. In a variant such as is sketched in FIG. 1c, the various blocks of the scale reference structures can be configured such that, in the plane of the scanning plate, the corresponding intensity distribution results. In this context, it is possible in turn to use pure amplitude structures, pure phase structures, or a mixed form in the scale.

Furthermore, provision can be made when the two groups of reference mark structures in each case contain more than the blocks having correspondingly arranged partial areas. This has advantages with regard to contamination insensitivity, since the contamination of a block is then compensated by the multiplicity of further blocks in the same group. In total, the result in this way is a more stable reference pulse evaluation.

In the exemplary embodiments described, special detector arrangements having relatively large-surface detector elements were used in each case for the generation of reference pulse signals. It is also possible in principle to use so-called detector arrays in the detector unit in this location, as is known for the optical scanning of an incremental graduation track. Detector arrays of this type are composed of a multiplicity of beam-sensitive detector elements arranged to be directly adjoining in the measuring direction, the detector elements having clearly smaller surfaces. Detector elements that supply equiphase scanning signals are, in this context, electrically interconnected to each other. The detector elements in the detector unit would then be composed in each case of a number of adjoining individual detector elements of the detector array connected together. An advantage of a variant of this type is the reduction in the quantity of component parts.

It will be apparent to those skilled in the art that various modifications and variations can be made in the structure and methodology of the present invention, without departing from the spirit or scope of the invention. Thus, it is intended that the present invention covers the modifications and variations of this invention provided they come within the scope of the appended claims and their equivalents.

What is claimed is:

1. An optical position measuring device for determining a relative position of two objects movable with respect to each other in a measuring direction, by generating a reference pulse signal corresponding to at least one defined relative reference position, the position measuring device comprising:

a scale having a scale reference mark structure, the scale being connected to one of the two objects and the scale reference mark structure being composed of n (n=2,3,4 . . . ) blocks disposed in the measuring direction, the scale reference mark structure blocks having a plurality of sequentially arranged partial areas of varying optical characteristics disposed in the measuring direction; and a scanning unit connected to the other of the objects and including a scanning plate with a plurality of detector elements and a scanning reference mark structure composed of n scanning reference blocks arranged sequentially in the measuring direction, the scanning reference mark structure blocks having assigned to them corresponding detector elements;

wherein at least a first group of blocks of one of the scale reference and scanning reference mark structures is configured, at the reference position in the plane of a respective other one of the scanning reference and scale reference mark structures, to supply an intensity distribution that is identical to the structure of the associated first group of blocks, wherein at least a second group blocks of another one of the scale reference and the scanning reference mark structures, in a plane of a respective other one of the scanning reference and scale reference mark structures, supplies an intensity distribution that is complementary to the structure of the associated second group of blocks, and wherein the detector elements are interconnected such that output signals of the detector elements of each group of blocks are connected to each other to generate a reference pulse output signal resulting from the output signals, said reference pulse output signal having a maximum or a minimum at the defined relative position of the two objects.

2. The optical position measuring device as recited in claim 1, wherein the scanning reference mark structure is a pure amplitude structure having for each scanning reference mark structure block an arrangement of partial areas with varying optical characteristics, such that one first group of scanning reference mark structure blocks includes a first arrangement of partial areas identical to a first arrangement of partial areas of associated scale reference mark structure blocks, and such that a second group of scanning reference mark structure blocks includes a second arrangement of partial areas complementary to a second arrangement of partial areas of associated scale reference mark structure blocks.

3. The optical position measuring device as recited in claim 1, wherein the scanning reference mark structure is one of a phase structure and a combined phase/amplitude structure.

4. The optical position measuring device as recited in claim 3, wherein the scanning reference mark structure is a combined phase/amplitude structure comprising transparent and non-transparent partial areas, and phase-shifting structures disposed in the transparent partial areas.

5. The optical position measuring device as recited in claim 1, further comprising connections to differentially connect the reference pulse output signal of the first and second groups of blocks.

6. The optical position measuring device as recited in claim 1, further comprising a subtraction element operating on the reference pulse output signal.

7. The optical position measuring device as recited in claim 1, wherein each block of the scale reference mark structure and each block of the scanning reference mark structure comprises a plurality of partial areas which are alternatively optically transparent and non-transparent.

8. The optical position measuring device as recited in claim 1, wherein each block of the scale reference mark structure and each block of the scanning reference mark structure comprises a plurality of partial areas that are alternatively optically reflecting and non-reflecting.

9. The optical position measuring device as recited in claim 1, wherein surfaces of the detector elements are larger than surfaces of the associated scale reference and scanning reference blocks.

10. The optical position measuring device as recited in claim 1, comprising an even number of blocks of the two groups of scale reference and scanning reference mark structures, and wherein surfaces of the scale reference and scanning reference blocks are identical.

11. The optical position measuring device as recited in claim 1, comprising an odd number of blocks of the two groups of scale reference and scanning reference mark structures, and wherein the sum of surfaces of the first group is identical to the sum of surfaces of the second group of the scale reference and scanning reference mark structures.

* * * * *

UNITED STATES PATENT AND TRADEMARK OFFICE
CERTIFICATE OF CORRECTION

PATENT NO. : 6,175,414 B1
DATED : January 16, 2001
INVENTOR(S) : Holzapfel et al.

Page 1 of 1

It is certified that error appears in the above-identified patent and that said Letters Patent is hereby corrected as shown below:

Column 7,
Line 33, change "... $R_{IT}$" to -- $RI_T$ --.
Line 37, change "... $R_{IT}$" to -- $RI_T$ --.

Signed and Sealed this

Sixth Day of November, 2001

Attest:

NICHOLAS P. GODICI
Attesting Officer   Acting Director of the United States Patent and Trademark Office